Jan. 31, 1928.
F. C. DEVEREUX
VALVE
Filed Jan. 8, 1926
1,657,663
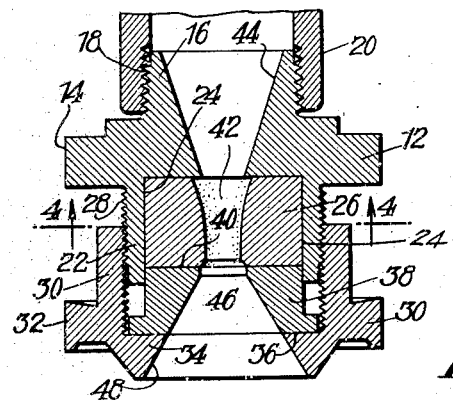
Fig. 1.
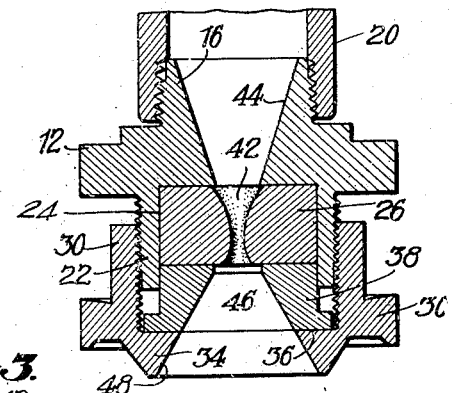
Fig. 2.
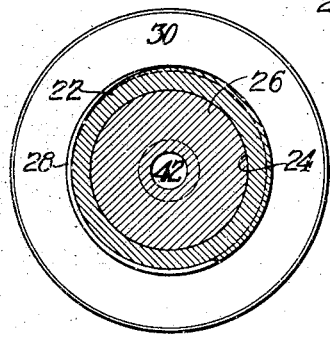
Fig. 4.
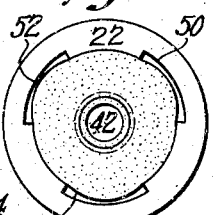
Fig. 3.
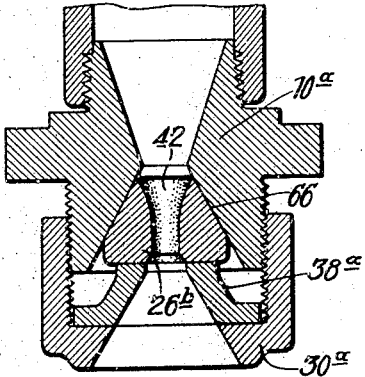
Fig. 8.
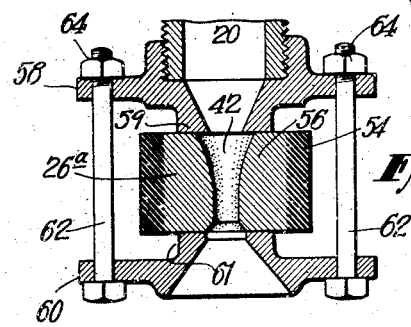
Fig. 6.
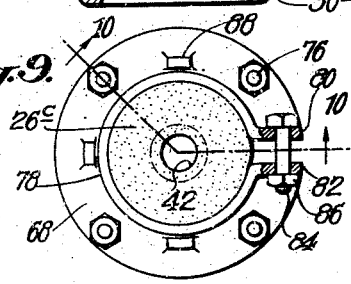
Fig. 5.
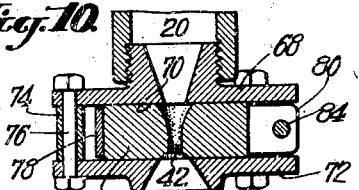
Fig. 9.
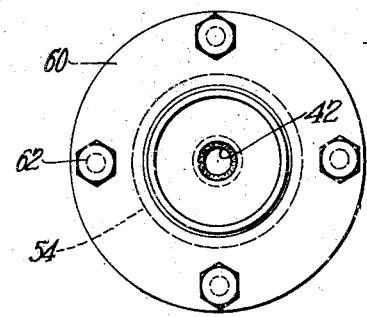
Fig. 7.
Fig. 10.
INVENTOR
FRANCIS C. DEVEREUX
BY
ATTORNEY Patented Jan. 31, 1928.

1,657,663

UNITED STATES PATENT OFFICE.

FRANCIS C. DEVEREUX, OF MINAS DE MATAHAMBRE, CUBA.

VALVE.

Application filed January 8, 1926. Serial No. 79,942.

This invention relates to valves adapted to control the rate of flow of a liquid by varying the sectional area of a portion of the valve. While not limited thereto, the valve herein described is well adapted for controlling the flow of lime emulsion or solution used for flotation in mineral separating apparatus.

Certain embodiments of the invention are illustrated in the accompanying drawings in which—

Fig. 1 is a central longitudinal section showing the valve adjusted to give a maximum rate of flow;

Fig. 2 is a section similar to Fig. 1 showing the valve adjusted to give a lower rate of flow;

Fig. 3 is a detail section of a compressible valve element;

Fig. 4 is a cross-section on line 4—4 of Fig. 1;

Fig. 5 is a cross-section somewhat similar to Fig. 4 but showing a slightly modified construction;

Fig. 6 is a longitudinal section illustrating an alternative embodiment of the invention;

Fig. 7 is an end view of Fig. 6;

Fig. 8 is a detail section illustrating a further modification;

Fig. 9 is a sectional view illustrating a further alternative form of the invention;

Fig. 10 is a sectional view on line 10—10 of Fig. 9.

Referring first to the embodiment of the invention illustrated in Figs. 1 to 4 inclusive, the valve comprises a metallic body 10 having a flange portion 12 provided with a knurled edge 14 and an upwardly extending spud 16 which is externally threaded at 18 for engagement with a pipe or other fitting 20. Extending oppositely from the spud portion 16, the valve body is formed with a sleeve-like portion 22 having a chamber 24 formed therein for accommodating a compressible valve element 26 which is preferably formed of rubber or similar resilient compressible material of a composition which will permit it to contract and expand, respectively, when the pressure is exerted on and released therefrom.

The sleeve portion 22 is provided on its exterior with screw threads 28 for engagement with a member 30 having suitable internal threads for coaction with the threads 28. This member is provided with a knurled flange 32 by which the member may be screwed and unscrewed from the sleeve portion 22.

The member 30 is chambered on the interior and is of such cross-sectional form that an annular shoulder 34 is provided. This shoulder is adapted to press against the flat surface 36 of a block 38 whose opposite face 40 bears on the underside of the compressible valve element 26.

The valve element 26 is formed with a central longitudinally extending passage 42 which is substantially in alignment with openings 44 and 46 formed, respectively, in the spud 16 and block 38. In the particular valve illustrated in this figure, the valve element 26 is adapted to regulate the rate of flow of liquid from the pipe 20 and the valve may be said to form part of a nozzle structure. For this reason, openings 44 and 46 flare outwardly from the passage in the valve element 26. The outlet orifice 48 of the member 30 also flares outwardly as shown, the walls of the openings 46 and 48 being tapered or inclined at substantially the same angle so as to form a cone-like discharge outlet.

The normal shape and size of the passage 42 of the compressible valve element 26 is indicated in Figs. 1 and 3. And the passage in its normal state is of such cross-sectional area that the maximum volume of liquid can be passed therethrough in a given length of time. When it is desired to cut down the rate of flow, the member 30 is turned so as to screw it on the sleeve portion 22 and thereby forcibly press the block 38 against the valve element 26. This action exerts sufficient pressure on said valve element to decrease the cross-sectional area of the passage 42. Comparison of Fig. 2 with Fig. 1 illustrates the decrease in diameter of the passage 42.

This, of course, will control the rate of flow of liquid from the pipe 20 through the valve. It is apparent that by manipulating the member 30, a fine regulation of the volume of fluid passing through the valve can be obtained. The hole or passage in the valve is circular and it remains substantially circular at all times regardless of the adjustability. It is clear that the decrease in sectional area of the passage 42 is due to the fact that the element 26 being confined within the chamber 24 cannot expand outward. And when pressure is exerted the expansion of the mass must be inward resulting in restricting the effective area of the passage 42.

It is not to be understood, however, that I am limited to a construction in which the compressible material must always expand inward. I may arrange the sleeve portion 22 with recesses 50 as indicated in Fig. 5 which will permit portions 52 of the valve element 25 to bulge outwardly when compressed. This arrangement will give a slightly finer adjustment of the area of the passage 42, it being understood that the provision for the body of material in expanding both outward and inward, the change in diameter of the passage will take place more gradually.

The compressible valve element need not necessarily be confined in the chamber such as indicated at 24 in Figs. 1 and 2. Fig. 6 illustrates such an arrangement wherein the valve element 26ª is formed with an outer portion 54 of comparatively hard rubber and an inner portion 56 of a softer more readily compressed rubber, the passage 42 being formed in the soft rubber. There is no enclosing chamber for this valve element 26ª. The area of its passage 42 is varied by varying the distance between a pair of flange members 58 and 60 the former being screwed on a supply pipe 20 and bolts 62 being provided which pass through suitable aligned openings in the members 58 and 60. These members are provided with bosses 59 and 61 which press against the opposite faces of the soft rubber of the valve element 26ª. It will be readily understood that by manipulating the nuts 64 the effective sectional area of the passage 42 will be varied.

Fig. 8 illustrates a further modification of the invention wherein the valve element 26ᵇ is of substantially frusto-conical form and adapted to be confined in a substantially conical chamber 66 formed in a metallic body 10ⁿ. A suitable block 38ª and member 30ª are provided for compressing the rubber element 26ᵇ so as to vary the area of the port 42.

In Figs. 9 and 10, I have illustrated a further alternative form of the invention wherein the effective area of the passage 42 of a compressible valve element 26ᶜ is varied by pressure exerted at the periphery instead of compressing the element longitudinally as in the other figures. In this form of the invention, the pipe 20 carries a flange member 68 the undersurface 70 of which rests on the upper surface of the valve element 26ᶜ. Another flange plate 72 is held in spaced relationship from the member 68 by spacers 74 through which suitable fastening bolts 76 pass. Encircling the valve element 26ᶜ is a band or split ring 78 the ends 80 and 82 of which extend radially outward. These ends are perforated for the reception of a bolt 84 which is provided with a suitable nut 86 adapted to be tightened up to contract the band or split ring so as to compress the valve element 26ᶜ. The split ring 78 is held centrally with respect to the plates 68 and 72 by means of suitable upstanding lugs 88.

My improved type of valve while not limited thereto is particularly useful for controlling the flow of liquids containing small particles in suspension. The rubber or other compressible composition used is more durable than iron or brass in resisting detrition or abrasion and in practice, I have determined that my improved valve has a longer life than ordinary valves heretofore used. The compressible valve element has a further advantage in handling solutions which are liable to cake or encrust on the surface. The caked particles can be broken and dislodged by either expanding or contracting the valve. A further advantage of my improved valve over conventional types of globe-valves and gate-valves is that there is no obstruction of any kind to the smooth and straight passage of the liquid through my valve. In the case of globe valves, the liquid is compelled to make an abrupt change in its direction and in gate-valves the guide grooves for the gates prevent smooth passage for the liquid through the same. These obstructions in the path of flow caused by changing direction in the case of the globe valve and by grooves and guiding members in gate-valves set up eddy currents which result in a diminished or uneven flow through the valve.

While I have described with great particularity the details of construction of the embodiments of the invention herein illustrated, it is not to be construed that I am limited thereto as various modifications may be made by those skilled in the art without departing from the invention as defined in the appended claims.

What I claim is:

1. A valve comprising a metallic body formed with an inwardly converging throat and having a hollow cylindrical portion adjacent said throat the exterior of which is screw threaded, a substantially cylindrical valve element of compressible material seated in said hollow cylindrical portion, said element having a longitudinal passage therethrough, a block engaging said element and loosely fitting the hollow cylindrical portion of the valve body and a member engaging said block having threads to fit the threaded exterior of said valve body.

2. A valve of the character described comprising a body formed with an inwardly converging throat at one end and with an externally threaded hollow cylindrical portion, a rubber valve element seated in the cavity in said cylindrical portion, said valve element having a passage extending therethrough which flares outwardly toward said flaring throat, a block formed with an outwardly flaring throat, said block engaging said rubber valve element and a threaded member screwing on said cylindrical portion arranged to press said block against said rubber valve element so as to restrict the cross-sectional area of the opening in said valve element.

In witness whereof, I have hereunto signed my name.

FRANCIS C. DEVEREUX.